United States Patent [19]

Wang

[11] Patent Number: 5,067,016
[45] Date of Patent: Nov. 19, 1991

[54] PROGRESSIVE SCAN SYSTEM WITH FIELD-OFFSET SAMPLING

[75] Inventor: Jinn-Shyan Wang, Hsin-Chu, China

[73] Assignee: Industrial Technology Research Institute, Taiwan

[21] Appl. No.: 489,808

[22] Filed: Mar. 7, 1990

[51] Int. Cl.[5] .................. H04N 7/01; H04N 7/18; H04N 7/12; H04N 11/06
[52] U.S. Cl. .................. 358/140; 358/138; 358/136; 358/12; 358/105
[58] Field of Search .............. 358/140, 141, 11, 12, 358/138, 135, 136, 105

[56] References Cited

U.S. PATENT DOCUMENTS

| | | | |
|---|---|---|---|
| 4,364,090 | 12/1982 | Wendland | 358/140 |
| 4,389,668 | 6/1983 | Favreau | 358/83 |
| 4,400,719 | 8/1983 | Powers | 358/11 |
| 4,415,931 | 11/1983 | Dischert | 358/11 |
| 4,509,071 | 4/1985 | Fujimura et al. | 358/11 |
| 4,598,309 | 7/1986 | Casey | 358/11 |
| 4,639,783 | 11/1987 | Fling | 358/138 |
| 4,661,839 | 4/1987 | Plantholt et al. | 358/12 |
| 4,661,850 | 4/1987 | Strolle et al. | 358/12 |
| 4,672,424 | 6/1987 | Lechner | 358/11 |
| 4,716,453 | 12/1987 | Pawelski | 358/138 |
| 4,723,157 | 2/1988 | Wendland et al. | 358/12 |
| 4,733,299 | 3/1988 | Glenn | 358/140 |
| 4,782,387 | 11/1988 | Sabri et al. | 358/133 |
| 4,845,561 | 7/1989 | Doyle et al. | 358/140 |

Primary Examiner—John K. Peng
Attorney, Agent, or Firm—Darby & Darby

[57] ABSTRACT

A progressive scanner embodying the present invention improves the image quality of a television display by reducing the amount of adverse effects caused by interlace scanning. First, the incoming interlaced video signals of two successive fields are sub-sampled with spatial offset from each other, and the data rate and the picture elements are reduced by half. Second, the vertical resolution is doubled and the adverse effects removed. This is accomplished by generating interpolated signals with either a line memory or a field memory from the sub-sampled interlaced signals and creating a progressive display form by interpolating the generated signals. Both the required memory and the operational frequency in the progressive scanner are reduced because the data rate is reduced by the sub-sampling process. The sub-sampling process reduces the picture elements by half while retaining the horizontal resolution. The resolution is kept intact by sub-sampling the signals and interpolating the generated signals with an offset result in a display form of a three dimensional pattern of five points, one is each corner of a box and one in the middle of a square known as the quincunx pattern. To prevent the introduction of error in high frequency analysis known as the aliasing effect, the bandwidth of the incoming interlaced video signals can be limited before sub-sampling.

8 Claims, 11 Drawing Sheets

PROGRESSIVE SCAN SYSTEM WITH FIELD-OFFSET SAMPLING

FIELD OF THE INVENTION

This invention relates to a display system, and more particularly, concerns a digital television receiver with a "progressive scan" capability.

BACKGROUND OF THE INVENTION

The interlacing process of the prior art broadcast systems, such as the 525 line-per-frame, 30 frame-per-second (525/30) NTSC system or the 625/25 PAL system, induces adverse effects. For example, line structure is visible because the interlaced process divides the 525-line picture or frame into two successive 262.5-line fields, reducing the vertical resolution. Another adverse effect is the interline flicker, resulting from the corresponding picture elements of the two successive fields being displaced in both time and space.

In the past, these adverse effects were not considered to be serious because of the low pass filter effect resulting from the interaction of the monitor with the viewer's eyes, and the viewer's subconscious tendency to ignore them. However, the use of wide-screen displays and the increased visual quality requirements of improved definition television systems (IDTV) and high definition television systems (HDTV) necessitate enhanced picture quality. One approach to achieve this, which is known in the art, is the progressive scan technique. In one form of progressive scan system, the horizontal scan rate is multiplied, i.e., doubled, and each line of video is displayed twice, providing a displayed image having reduced line visibility. In this scan system, the added video signal lines duplicate the original scan lines as described in U.S. Pat. No. 4,415,931 to Dischert entitled TELEVISION DISPLAY WITH DOUBLED HORIZONTAL LINES.

In another form of a progressive scan system the "extra" lines for the display are obtained by interpolation between adjacent horizontal lines of the incoming video signal, as described in U.S. Pat. No. 4,400,719 to Powers entitled TELEVISION DISPLAY SYSTEM WITH REDUCED LINE SCAN ARTIFACTS.

It is also known in the art that an "adaptive" progressive scan system can be applied which automatically switches between an intrafield interpolation filter and an interfield interpolation filter, improving the displayed image quality for the motion pictures and the still pictures, respectively. This method is described in U.S. Pat. No. 4,598,309 to Casey, entitled TELEVISION RECEIVER THAT INCLUDES A FRAME STORE USING NON-INTERLACED SCANNING FORMAT WITH MOTION COMPENSATION.

When implementing a progressively scanned receiver with digital processing circuits, random access memory (RAM) is typically utilized to store incoming sampled and digitized video signals. For NTSC standard video signals, the sampling clock frequency is often selected to be four times that of the color subcarrier frequency ($f_{sc}$) or about 14.3 MHz, with a period of about 70 nanoseconds. Then, in the progressive scan processor, the read-out frequency of the random access memory will be as high as 28.6 MHz ($8f_{sc}$), because the displayed data rate is twice that of the incoming data rate, as described in the prior art. This sampling clock frequency and the standard NTSC line period of about 63.5 microseconds requires 910 RAM memory locations to store the video samples or "pixels" (picture elements). The adaptive interpolation system requires about 1.9 M bit of field memory, which is too large to be integrated into an ASIC chip with other necessary functional blocks.

The progressive scan processor increases vertical resolution while reducing adverse effects such as visible line structure and line crawling. However, such a high rate of input data into the progressive scan processor (PSP) of the prior art required a memory that is too large and expensive to be practical. Even with external memory an ASIC PSP chip remains difficult to design by a low-cost process because the required operational frequency is high.

A need therefore exists to reduce the signal data rate into a progressive scan processor to lower both the memory requirement and the high operational clock frequency. However, this process must reduce the adverse effects encountered in an interlace-scanned video receiver.

It is an object of the invention to provide an improved television display without the adverse effects due to the interlaced scanning process.

It is another object of the invention to increase the resolution of a television display by a progressive scanning with a higher line-rate.

It is a further object of the invention to improve the progressive scanning process by reducing the data rate into the progressive scan processor to reduce both the required memory and the operational frequency.

In accordance with the present invention, the standard line-rate incoming interlaced video signals are first sub-sampled. The signals in the first of two successive fields are sub-sampled with diagonal offset relative to the signals in the second field. Then, interpolated signals are generated from the sub-sampled interlaced signals by either a line memory or a field memory. Finally, a higher displayed line rate is utilized to interpolate each generated line signal using a diagonal offset between two adjacent, sub-sampled interlaced line signals. Also, the bandwidth of the incoming interlaced video signals can be limited before sub-sampling them, preventing the introduction of error in high frequency analysis known as the aliasing effect.

BRIEF DESCRIPTIONS OF THE DRAWINGS

The foregoing features of the present invention will be more readily apparent from the following detailed description and the accompanying drawings of illustrative embodiments of the invention in which.

DETAILED DESCRIPTION OF THE INVENTION

Figure 1A:
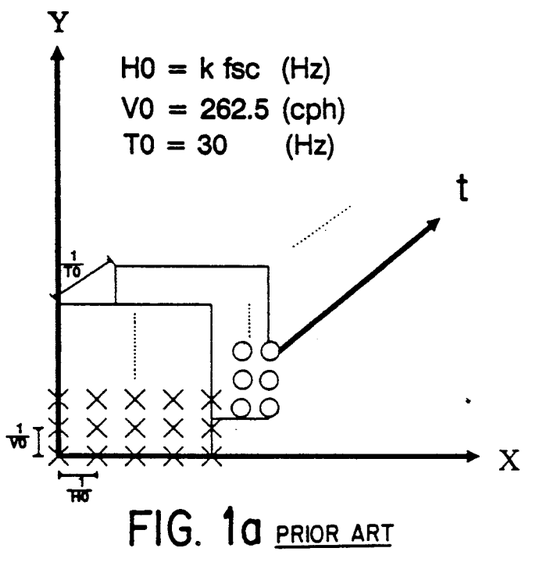
FIG. 1(a) illustrates the sampling process in a digital television receiver using the prior art.
Figure 1B:
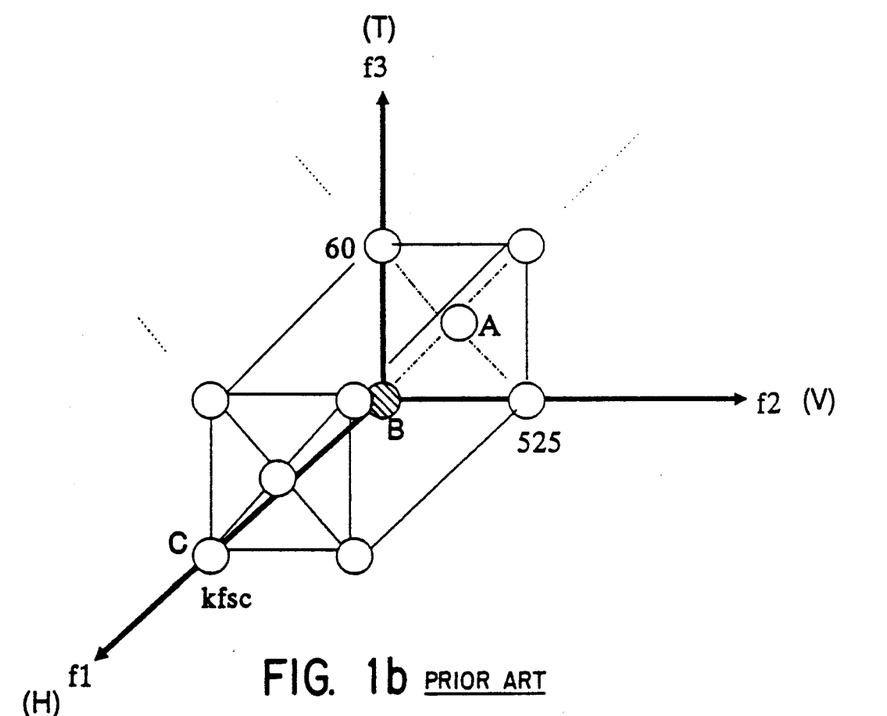
FIG. 1(b) illustrates the three-dimensional spectrum corresponding to the process in FIG. 1(a)

FIGS. 1(a) and 1(b) illustrate the sampling process and the three dimensional spectrum of the video signal of a conventional digital television receiver. The shaded part B of FIG. 1(b) represents the baseband signal. Also sketched in FIG. 1(b) are the replicas of the baseband B created by the sampling processes in the horizontal (H), vertical (V), and temporal (T) directions. The proximity of duplicate band A to baseband B causes adverse effects on the display quality. The duplicated bands in the horizontal direction are caused by the additional sampling process in this direction. The horizontal sampling frequency is assumed to be k times that of the color subcarrier frequency ($k \cdot f_{sc}$). These duplicate bands may cause an aliasing side-effect if the chosen k factor is not sufficiently high. Because the 3-db frequency of the video luminance signal is a little over one $f_{sc}$, the sampling frequency of the A/D converter is commonly chosen as $4f_{sc}$ to prevent the aliasing problem. After the video processing, a spatial low pass filter with a bandwidth of slightly larger than the 3-db frequency of the video signal recovers the baseband signal.

Figure 2A:
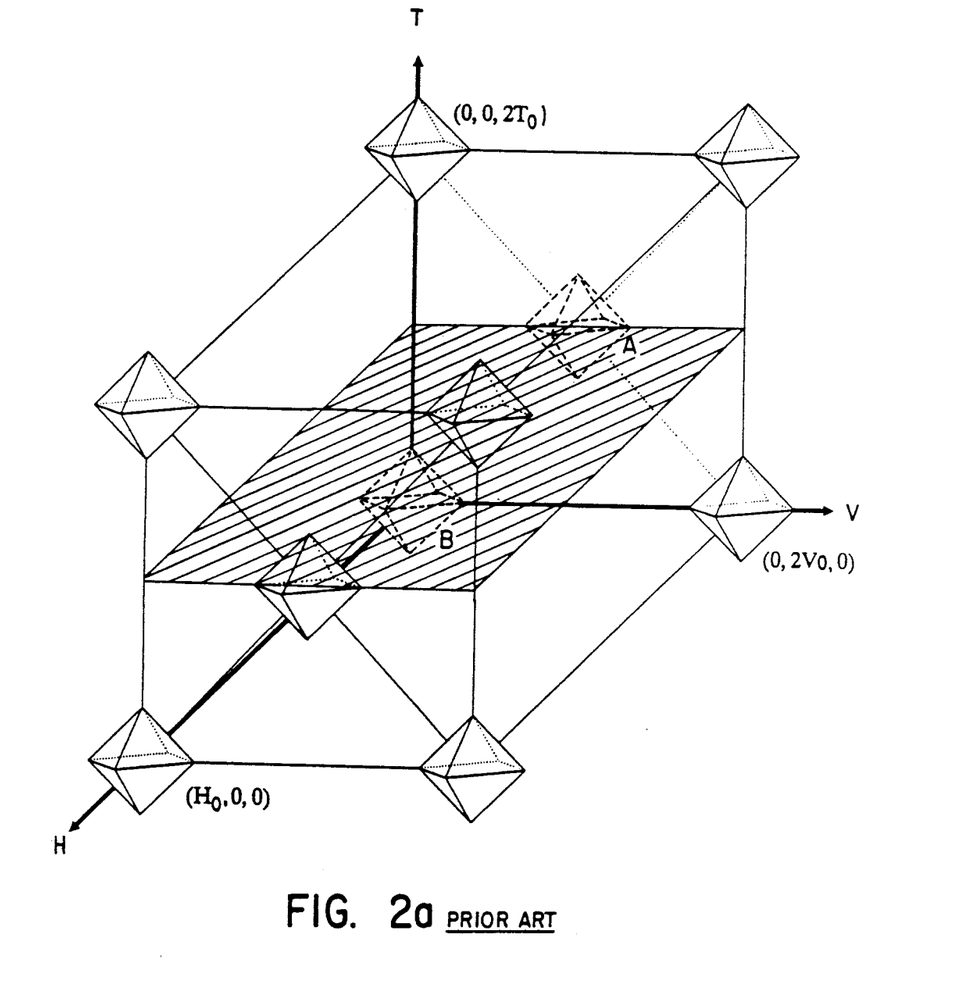
FIG. 2(a) illustrates the three dimensional spectrum obtained with interfield interpolation filtering of prior art adaptive progressive scan systems.
Figure 2B:
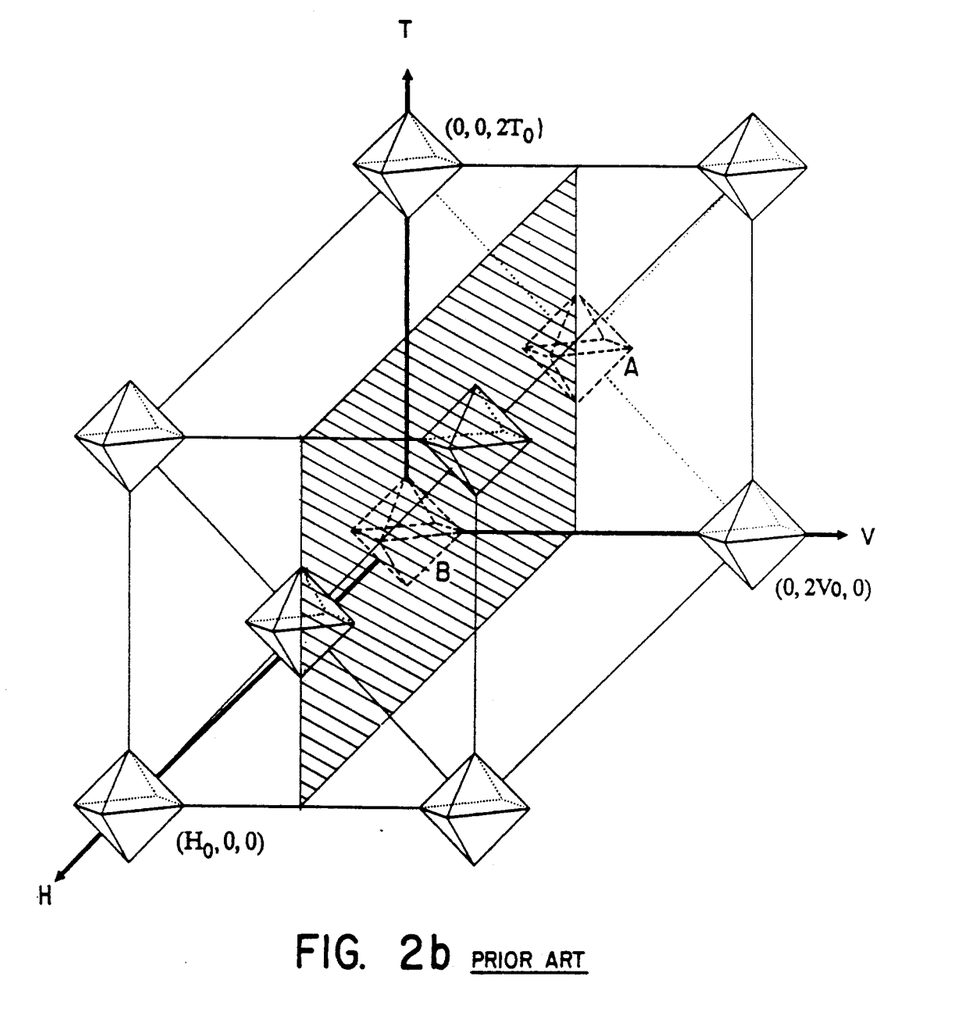
FIG. 2(b) illustrates the three-dimensional spectrum obtained with an intrafield interpolation filtering of prior art adaptive progressive scan systems.

In a progressive scan processing with an adaptive motion compensation approach, an interfield interpolation function or an intrafield interpolation function can be selected for the still picture and the motion picture, respectively, reducing the visual effects caused by the band A in FIG. 1. In reality, the interpolation process has the low pass filter effect with a cosine amplification function as described by T. Okada, et al., in a paper entitled "Flickerfree Non-Interlaced Receiving System for Standard Color TV Signals" in IEEE Trans. Consumer Electronics, Vol. CE-31, No. 3, pp. 240–253, Aug. 1985. The spectrum representation for the adaptive PSP is shown in FIG. 2 with the stop bands of inter- and intrafield interpolation filters shown as the shaded planes. As shown in FIGS. 2(a) and 2(b), the stop band plane of the interfield interpolation filter passes through $(O, O, T_o)$ and $(O, V_o, T_o)$ and is perpendicular to the H-T plane. On the other hand, the stop band plane of the intrafield interpolation filter passes through $(O, V_o, O)$ and $(O, V_o, T_o)$ and is parallel to the H-T plane. Both filters can remove the adverse effects induced by band A in FIGS. 2(a) and 2(b).

With the sampling rate of $4f_{sc}$, the highest operational frequency of the PSP is $8f_{sc}$, and the required memory is large and impractical, as described above. However, the sampling frequency cannot simply be lowered to reduce the frequency and the required memory because it will introduce the high frequency error known as the aliasing effect as discussed above.

Figure 3:
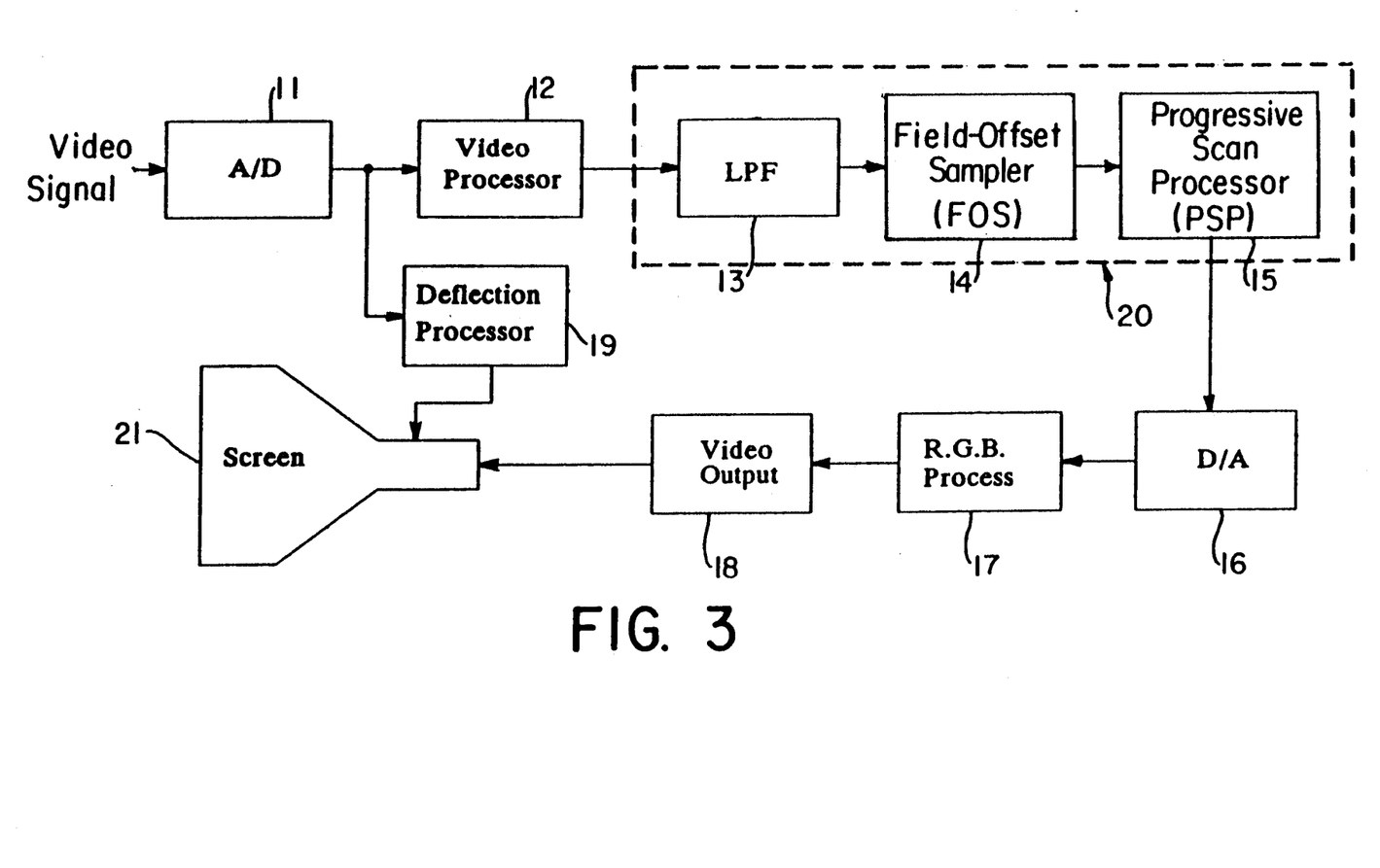
FIG. 3 is a functional block diagram of a digital television receiver utilizing one embodiment of the present invention.
Figure 4:
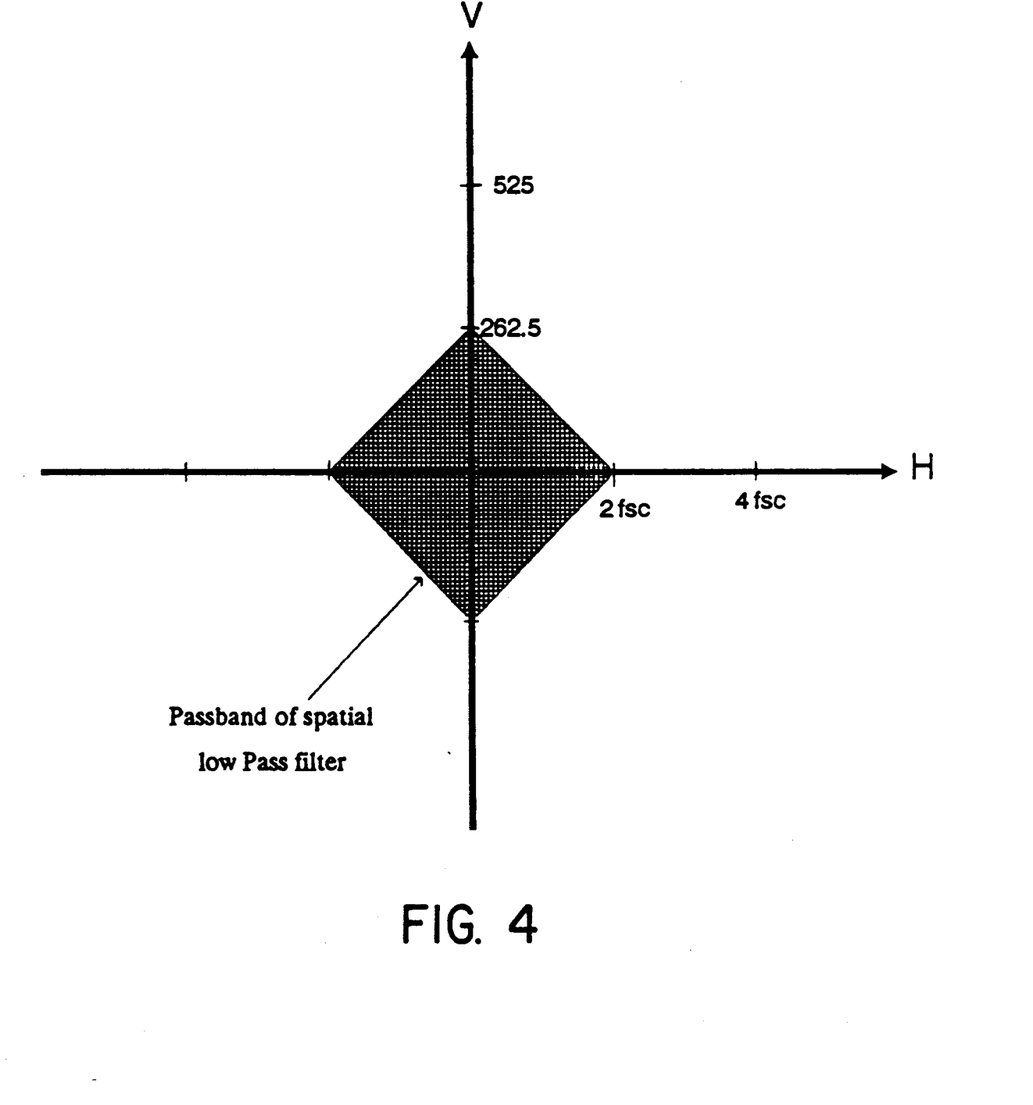
FIG. 4 illustrates the passband of a spatial low pass filter.

FIG. 3 shows a block diagram of a digital TV receiver utilizing one embodiment of the present invention. The signal bandwidth is limited by passing the video signal through the low pass filter 13. FIG. 4 shows the pass band of filter 13, which has a bandwidth of $2f_{sc}$ in the horizontal direction and a bandwidth of 262.5 cph (cycle-per-height) in the vertical direction. The resolution in the diagonal direction is lower than in the horizontal and vertical directions. However, this effect coincides with a perceptual effect described by Baldwin in a paper entitled "Enhancing Television: An Evolving Scene", Preprint No. 129-93 of the 129th SMPTE Technical Conference, according to which the viewers require less resolution in the diagonal direction than in the other two directions.

Figure 5A:
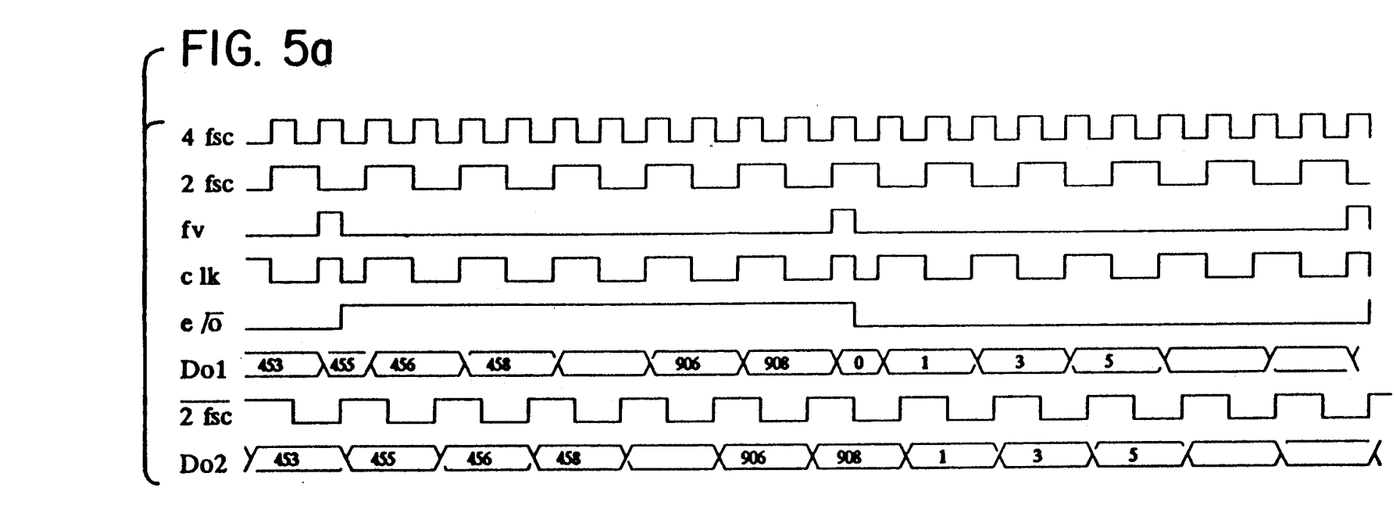
FIGS. 5(a) and 5(b) illustrate a timing chart and the logic diagram for an embodiment of the field-offset sampler, respectively.
Figure 5B:
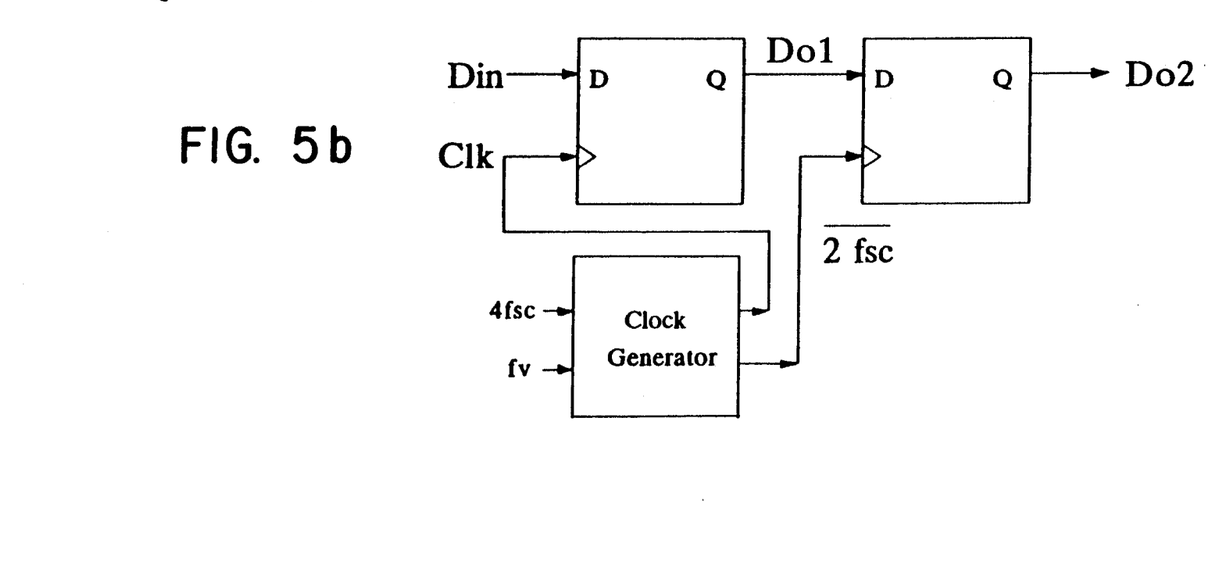
Figure 6A:
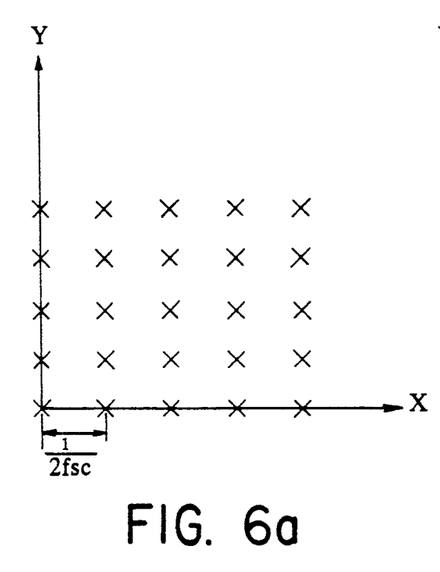
FIGS. 6(a) and 6(b) illustrate the sampling processes in even and odd fields of the field-offset sampler, respectively.
Figure 6B:
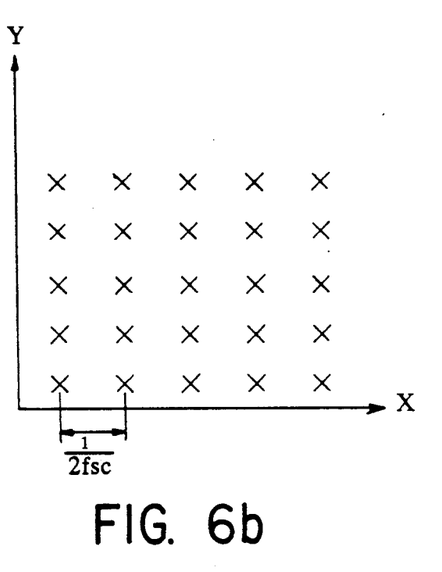
Figure 7:
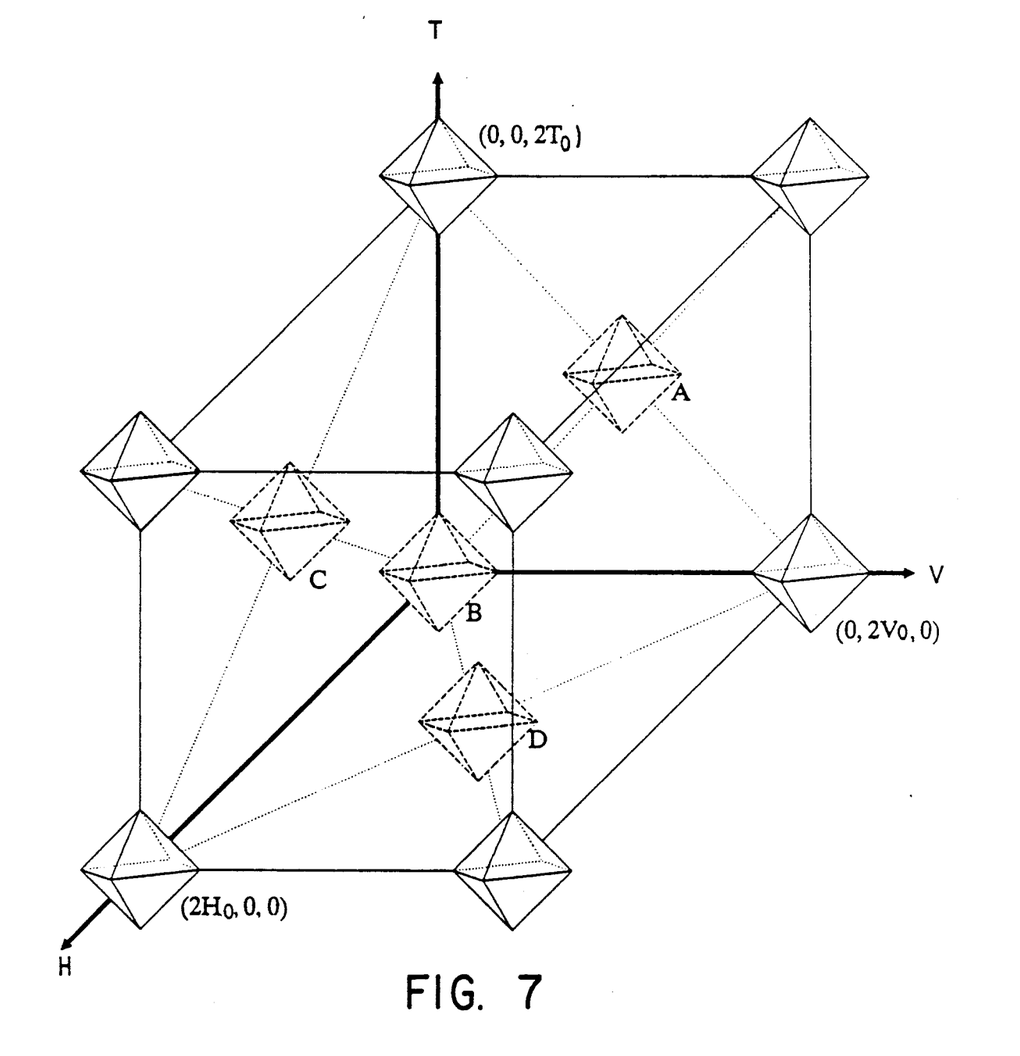
FIG. 7 illustrates the three-dimensional spectrum of the luminance signal after the field-offset sampler.

The data rate can be reduced by half by passing the signal out from the spatial filter 13 to a field-offset sampler 14 (FOS). An embodiment of the FOS 14 and the relevant timing diagrams are shown in FIGS. 5(b) and 5(a), respectively. In FIG. 5(a), the data rate of $D_{in}$ into the field-offset sampler is $4f_{sc} \times n$, where n is the encoding bit number of the input data. The clock signal (clk) and $2f_{sc}$ are generated by a clock generator in the field-offset sampler. As shown by the timing diagram, $D_{02}$ is sub-sampled from Din with only half the data rate of Din. The incoming interlaced video signal is further sub-sampled in the FOS 14. FIGS. 6(a) and 6(b) show these sampling schemes in the even and odd fields. Assuming the Fourier transform of the baseband signal is F, the resultant three-dimensional spectrum after the field-offset sampling process can be expressed as $$F' = \frac{1}{H_o \cdot V_o \cdot T_o} \cdot F \cdot$$

$$\sum_{a=-\infty}^{\infty} \sum_{b=-\infty}^{\infty} \sum_{c=-\infty}^{\infty} \delta(H - aH_o, V - bV_o, T - cT_o) \times$$

$$\{1 + \exp[-j\pi(a + b + c)]\},$$

where $H_o$ is $k \cdot fsc$ (Hz), $V_o$ is 262.5 (cph), $T_o$ is 30(Hz), H is the horizontal component, V is the vertical component, T is the temporal component, k is a chosen factor, a, b and c are integer indices, $\delta$ is delta function, and F is the baseband signal. This spectrum is illustrated in FIG. 7. FIG. 7 shows the three duplicate bands A, C, and D are nearest to the baseband B and will seriously affect B. There will be no aliasing between the bands B and D due to the spatial low pass filter 13. The band D will not be obvious to the viewer because it is diagonally away from B. However, the remaining two bands A and C need further consideration.

Figure 8:
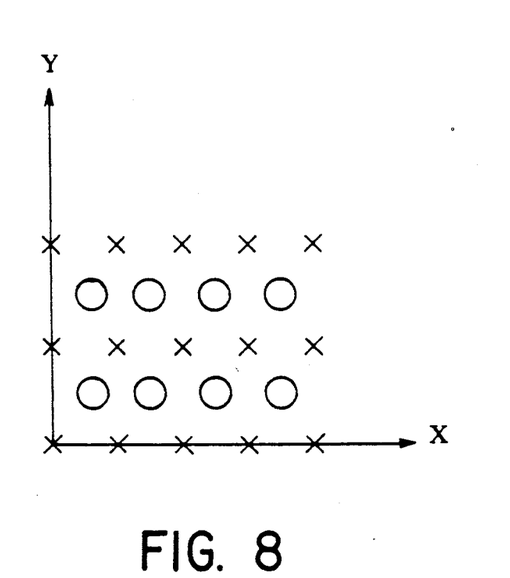
FIG. 8 illustrates a complete picture after the progressive scan processor of the present invention.

By outputting the signal from the FOS 14 to the progressive scan processor 15 (PSP), either the intrafield interpolation or the interfield interpolation is applied adaptively in the PSP 15. The complete picture display is shown in FIG. 8, with each interpolated line, represented by circles, which may be taken from the previous line with diagonal position offset or from the line in the previous field without position offset, displayed between two "real" lines, represented by "X'$_s$". The PSP 15 provides the time compressed scanning lines with two lines of time-compressed video displayed within one standard line interval.

The three dimensional spectrum of the signal after the interfield interpolation filter can be expressed as $$F'' = (1 + e^{-j\pi T/T_o})F'$$

where $T_o$ is 30(Hz) T is the temporal component and that after the intrafield interpolation filter can be derived as $$F''' = [1 + e^{-j\pi (V/V_o + H/H_o)}]F'  \quad\quad 5$$

where $H_o$ is k·fsc (Hz), $V_o$ is 262.5 (cph), H is the horizontal component, and V is the vertical component.

Figure 9A:
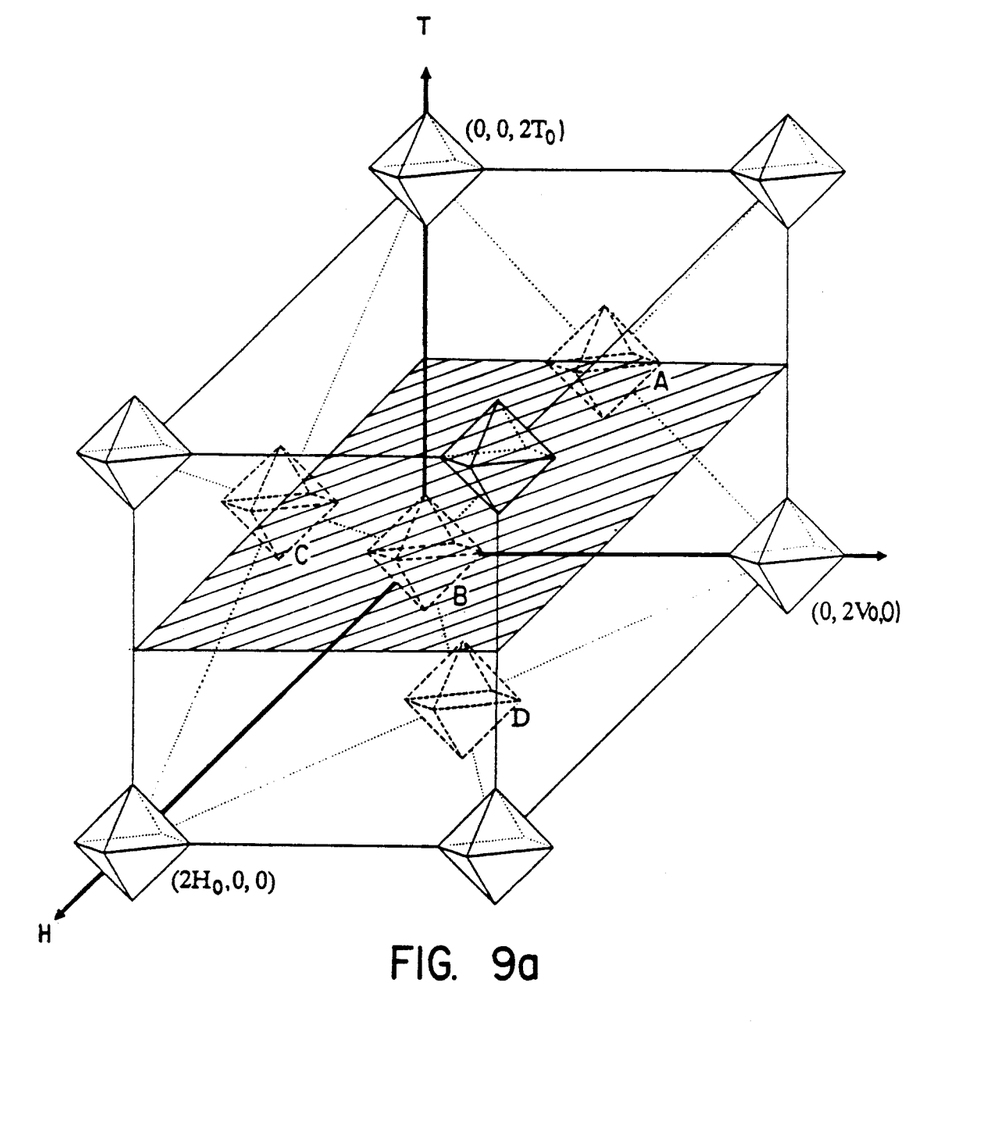
FIGS. 9(a) and 9(b) illustrate the three-dimensional spectrum of interfield interpolation and intrafield interpolation filtering, respectively.
Figure 9B:
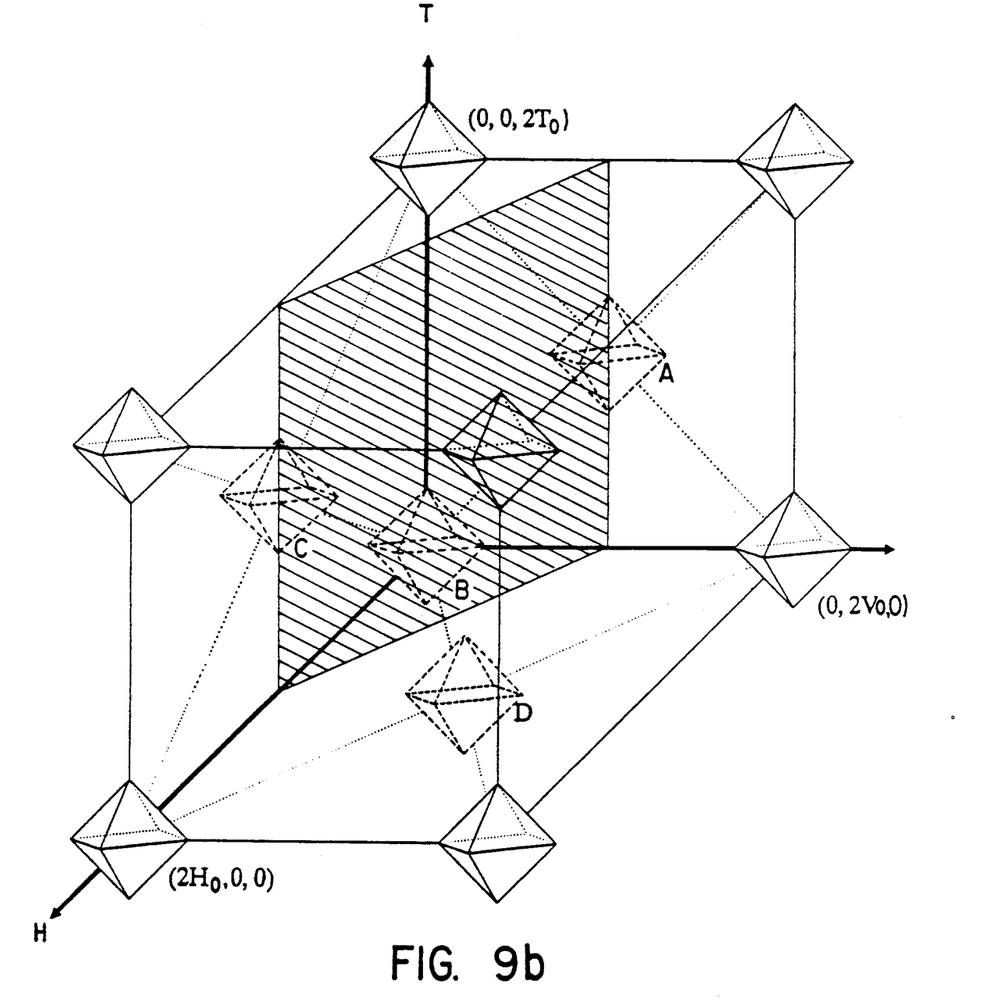

The low pass filter effects of the interpolation processes are shown in FIGS. 9(a) and 9(b) with the stop bands of the filters represented by the shaded planes. The opposite effects of the replica bands A and C can be removed by the progressive scan (interpolation) processes.

Figure 10:
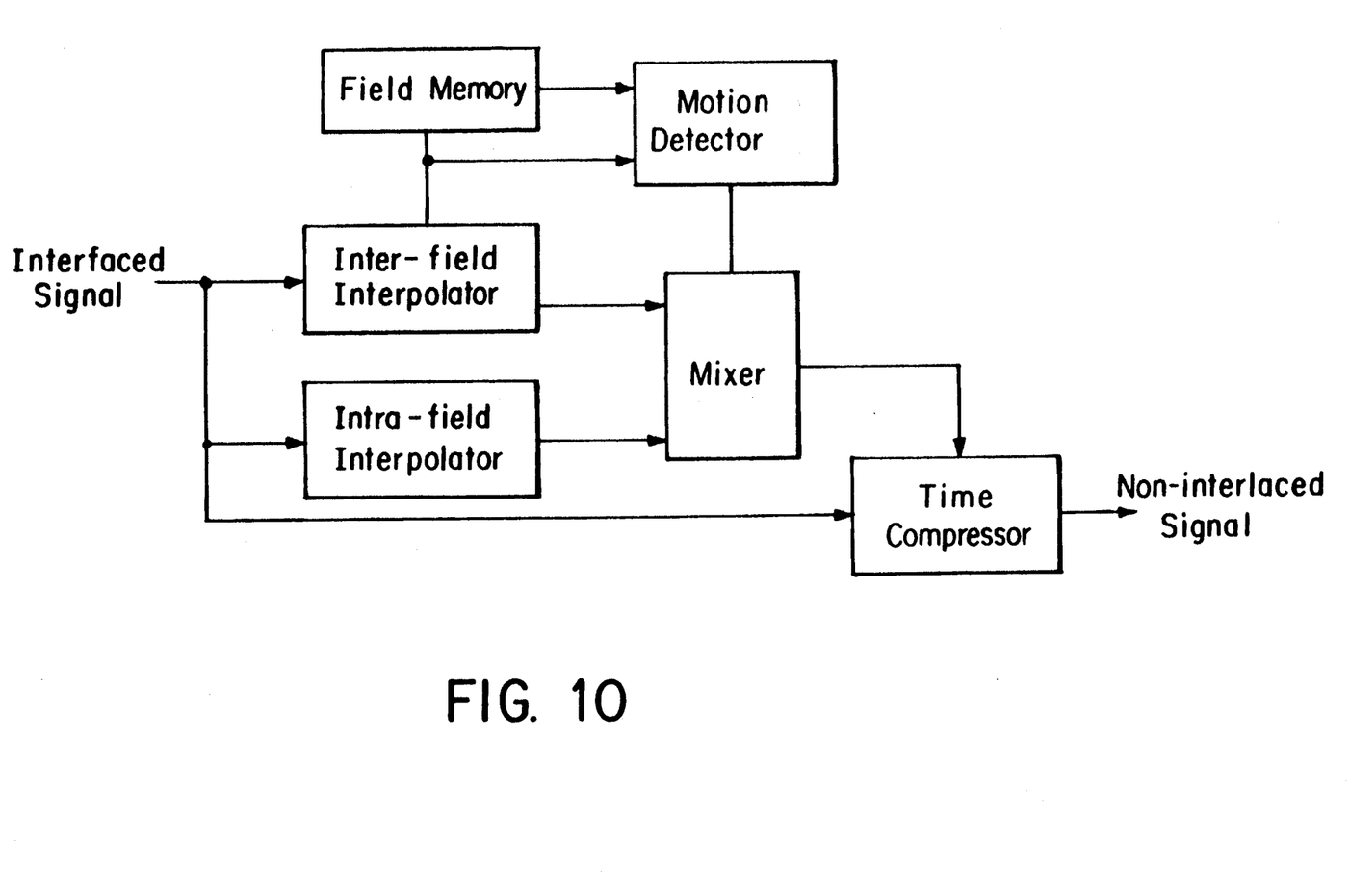
FIG. 10 is a functional block diagram of one embodiment or a progressive scan processor according to the present invention.

An example of the PSP 15 is shown in FIG. 10, and the operational principle of the PSP is referred to in "IDTV Receiver" by K. Kawai et al., published in IEEE Transaction on Consumer Electronics, Vol. CE-33, No. 3, pp. 181–190, Aug. 1987. The required memory in the PSP 15 is reduced by half because the incoming data rate is $2f_{sc} \times n$ (where n is the digit number of the encoded video signal). At the same time, the maximum operational frequency in the PSP, or even the entire TV receiver is only $4f_{sc}$ ($2 \times 2f_{sc}$), which ASIC design feasible.

A preferred form of the invention has been disclosed for illustrative purposes. Those skilled in the art will appreciate that many additions, modifications and substitutions are possible without departing from the scope and spirit of the invention as defined in the accompanying claims.

What is claimed is:

1. A method for generating non-interlaced video signals for displaying a picture having a higher displayed line-rate than the combined rate of the fields of a standard interlaced incoming video signal, comprising the steps of:
    sub-sampling the incoming interlaced video signal so that the signal in the first field is sub-sampled with diagonal offset with respect to that in the second field;
    generating interpolated line signals from said subsampled interlaced signal; and
    using the higher displayed line-rate, interposing, with diagonal offset, each interpolated line signal generated between two adjacent sub-sampled interlaced line signals.

2. The method of claim 1 further comprising the step of a limiting the bandwidth of said interlaced incoming video signal before sub-sampling the same.

3. The method of claim 1 wherein the interpolated line signal is generated by storing said sub-sampled interlaced video signals of the first field, said interpolated line signal being interposed between two adjacent line signals of the second field without spatial offset from the first field.

4. The method of claim 1 wherein:
    when the picture is stationary said interpolated line signals are generated by storing said sub-sampled interlaced video signals of the first field, and said interpolated line signals are interposed without spatial offset from the first field between two adjacent line signals of the second field; and
    when the picture is moving, said interpolated line signals are generated by storing the sub-sampled interlaced video line signal just displayed, and said interpolated line signals are interposed with diagonal offset in the next line of the same field.

5. A video signal processing apparatus for generating non-interlaced a replacement video signal with a higher displayed line-rate than the combined rate of the fields of a standard interlaced incoming video signal, comprising:
    means for sub-sampling the interlaced video signal so that the signal in the first field is sub-sampled with diagonal offset with respect to that in the second field;
    scanning means coupled to said sub-sampling means for generating an interpolated signal from the sub-sampled interlaced signals, said scanning means combining the interpolated signal between said two adjacent sub-sampled line signals at the higher displayed line-rate so that the interpolated signal is interposed between said adjacent sub-sampled line signals.

6. The video signal processing apparatus in claim 5 further comprising means for limiting the bandwidth of said incoming video signal before sending the signal to the sub-sampling means.

7. The video signal processing apparatus as recited in claim 5, wherein said scanning means includes means for storing the sub-sampled interlaced line signals in the first field as said interpolated line signals, and means for interposing, without spatial offset from the first field, each stored interpolated line signal between two adjacent interlaced line signals in the second field.

8. The video signal processing apparatus in claim 5, wherein:
    means in said scanning means responsive to the picture being stationary for storing said sub-sampled interlaced line signals in the first field as said interpolated line signal, and means for interposing, without spatial offset from the first field, each stored interpolated line signal between two adjacent interlaced line signals in the second field; and
    means in said scanning means responsive to the picture being in motion for storing said sub-sampled interlaced line signal most recently displayed in one field as said interpolated line signal, and means for reproducing, with diagonal offset, the stored interpolated line signal in the next line.

* * * * *